2,819,183
FLUORESCENT SCREENS

Francis Peter Alles, Westfield, N. J., assignor to E. I. du Pont de Nemours and Company, Wilmington, Del., a corporation of Delaware No Drawing. Application May 31, 1955
Serial No. 512,282

15 Claims. (Cl. 117—33.5)

This invention relates to a fluorescent screen and more particularly to an intensifying screen for radiographs. Still more particularly it relates to an X-ray intensifying screen of improved flexibility. Still more particularly it relates to such screens wherein the binding agent for the phosphor particles is composed of a chlorosulfonated polyolefin.

In the manufacture of intensifying screens a phosphor, e. g., calcium tungstate, barium sulfate/lead sulfate, zinc sulfide, zinc cadmium sulfide, etc., is dispersed in a polymeric binder (usually a plasticized cellulose derivative) in a ratio as high as 12–20 parts of phosphor to 1 part of binder. The purpose of the high phosphor concentration is to obtain maximum screen brightness for increased speed and improved definition and detail in radiographs obtained with the use of such screens. The result of such high concentrations with cellulose and equivalent binders is a brittle coating of phosphor. The brittle coating in turn requires a rigid (usually cardboard) support which will resist excessive flexing and thus prevent possible cracking of the coating. Due to the rigidity of the composite screen structure, considerable pressure is required for intimate and uniform contact between the surfaces of the intensifying screen and photographic film, which is necessary for the detail needed in diagnostic work. This lack of contact becomes more evident and objectionable as the size of the screen is increased, due to warping, curling, etc. of the support, resulting in a nonplanar surface. To overcome non-uniform contact between an X-ray intensifying screen and a photographic film, cassettes have been designed that use a multiplicity of springs, air pressure or air-filled bags, vacuum devices, soft felt and rubber-like materials and magnets.

An object of this invention is to provide an improved X-ray intensifying screen. Another object is to provide a flexible X-ray intensifying screen. A further object is to provide such a screen having a flexible thin layer of phosphor and a thin flexible support. A related object is to provide such screens with layers which have good adherence to a support and do not crack or peel from the supporting surface when said support is bent or flexed about a small radius. Still other objects will be apparent from the following description of the invention.

The intensifying screens of this invention comprise a flexible support, e. g., a sheet of paper; metal foil, e. g., a thin sheet of aluminum; or film of polymeric material bearing at least one layer of finely divided phosphor particles uniformly dispersed in a chlorosulfonated olefin addition polymer derived from mono- and diolefins having not more than 5 carbon atoms. The phosphor layer can be coated directly on the surface of the support or on a substratum, e. g., a layer containing light-reflecting pigment particles.

In making the novel intensifying screens, the phosphor particles are dispersed in a suitable organic solvent including hydrocarbons, e. g., benzene, toluene, tetrahydronaphthalene, decahydronaphthalene; chlorinated hydrocarbons, e. g., chloroform, carbon tetrachloride, trichloroethylene and tetrachloroethylene; or a ketone, e. g., methyl ethyl ketone, cyclohexanone. If desired, with the aid of a dispersing agent, e. g., tetraisopropyl titanate, dioctyl ester of sodium sulfosuccinic acid and mixtures of the latter with stearic acid, the dispersion is then admixed with the chlorosulfonated olefin addition polymer, the resulting solution is coated onto the support and the solvent or solvents are removed, e. g., by evaporation at room temperature or at an elevated temperature. The chlorosulfonated olefin addition polymer preferably is added from solvent solution to the dispersion of the phosphor. For convenience, the solvent can be the same as that used in the original phosphor dispersion. In order that the phosphor particles will be of fine particle size and free from agglomerates and slugs of polymer binding agent, the dispersion is milled, e. g., by means of a colloid mill or ball mill and then passed through a fine mesh screen, filter cloth or felt. By this procedure the phosphors will have a particle size approximately 3 to 6 microns in average diameter. The phosphor layers may vary in thickness from 0.001 to 0.015 inch but preferably from 0.004 to 0.009 inch in thickness.

Various adjuvants may be admixed with the phosphor dispersion in the olefin polymer. Among such adjuvants are vulcanizing agents, e. g., magnesium oxide, lead oxide and organic amines; vulcanizing accelerators, e. g., zinc dibutyldithiocarbamate and 2-mercaptoimidazoline; plasticizers, e. g., dioctylphthalate; and resins, e. g., coumarone-indene resins and the "Epon" resins having the formula:

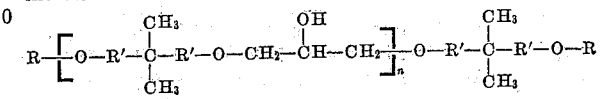

wherein R is

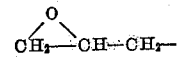

and R' is p-phenylene (sold by Shell Chemical Corporation). In general, the added resins should constitute not more than 50% by weight of the chlorosulfonated olefin polymer.

Chlorosulfonated olefin addition polymers useful as the binding agents and their preparation are described in U. S. Patents McQueen 2,212,786, McAlevy 2,416,060 and 2,416,061. They contain chlorine in the form of —$SO_2Cl$ groups and as chlorine atoms attached directly to carbon atoms of the polymer chain and the chlorine on a percentage basis will vary from 20 to 45% by weight at least 0.4% of which will be in —$SO_2Cl$ groups and the amount of sulfur in the form of such groups will vary from 0.4% to 3.0% by weight.

The ratio of phosphor particles to the chlorosulfonated olefin addition polymer may vary from 5 to 30 parts of the former per part by weight of the latter. The amount will vary with the particular polymer, but, in general, best results are obtained with 15 to 20 parts of the phosphor per part of polymer.

As stated above, the supports may be composed of various polymers. Among the useful polymers are cellulose derivatives, e. g., cellulose acetate, cellulose propionate, cellulose acetate propionate, cellulose acetate butyrate, ethyl cellulose; polyethylene, polyvinyl chloride, poly (vinyl chloride co vinyl acetate); vinylidene chloride copolymers with vinyl chloride, vinyl acetate, acrylonitrile, styrene and isobutylene; polystyrene and polyesters, e. g., polyethylene terephthalates and homologous polyesters obtainable by the processes described in Whinfield at al. U. S. Patent 2,465,319. The thickness of the support may be anywhere from 0.00025 to 0.030 inch depending upon the material chosen. Very thin polyethylene terephthalate films are particularly useful. These film bases may contain or be coated with dyes or finely divided pigments, e. g., TiO₂, lithopone, magnesium carbonate, aluminum oxide, carbon black and colored pigments; Tartrazine (Colour Index No. 640), Victoria Green WB Base (C. I. No. 657), Chinoline Yellow D [soluble in spirits] (C. I. No. 800) and Nubian Resin Black (C. I. No. 864), as opacifying or light-absorbing agents.

The invention will be further illustrated but is not intended to be limited by the following examples.

*Example 1*

To a mixture of 30 g. of toluene and 0.24 g. of tetraisopropyl titanate there was added rapidly with agitation 150 g. of calcium tungstate, 0.1 g. stearic acid, 0.1 g. of zinc dibutyldithiocarbamate and 1.0 g. of magnesium oxide. The mixture was ball-milled for 16 hours, and 35 g. of a 25% by weight solution in toluene of chlorosulfonated polyethylene containing 27.5% chlorine and 1.5% sulfur in which the sulfur is present as —SO₂Cl groups, and 2 g. of dioctyl phthalate was added and grinding was continued for 5 hours. Using a doctor blade opening of 0.022 inch, a coating was applied to 0.00025 inch polyethylene terephthalate film to give a dry phosphor coating of 0.006 inch to 0.007 inch thick.

*Example 2*

To 25 g. of toluene and 0.24 g. of tetraisopropyl titanate there was added rapidly with agitation 150 g. calcium tungstate, 0.2 g. stearic acid, 1.5 g. magnesium oxide, 0.1 g. 2-mercaptoimidazoline and the mixture was ball milled for 24 hours, at which time 40 g. of a 25% by weight solution in toluene of the chlorosulfonated polyethylene described in Example 1 was added and ball milling was continued for another 24 hours. The dispersion was filtered through 2 layers of felt. Using a doctor blade opening of 0.022 inch, a 0.007 inch to 0.008 inch film (dry) was cast onto a 0.0015 inch polyethylene terephthalate film and the layer was allowed to dry.

*Example 3*

To 75 g. of toluene and 0.7 g. of tetraisopropyl titanate there was added rapidly with agitation 450 g. calcium tungstate, 0.3 g. of 2-mercaptoimidazoline, 4.5 g. of magnesium oxide and 0.6 g. of stearic acid. The mixture was ball milled for 24 hours at which time 120 g. of a 25% by weight chlorosulfonated polyethylene solution in toluene was added and ball milling continued for 120 hours. The dispersion was filtered through a layer of felt and coated on a 0.003 inch paper support which had been water-proofed with cellulose nitrate.

*Example 4*

A 0.005 inch-thick coating (dry) of the above dispersion of Example 3 was applied (1) to a .003 inch-thick paper coated on each side with cellulose nitrate, (2) to a .005 inch-thick clear cellulose acetate film, (3) to a .009 inch-thick white pigmented cellulose acetate film, and (4) over the aluminum of an aluminized surface cellulose acetate film 0.005 inch-thick and having an optical density of 2.8 (manufactured by Minnesota Mining Company).

*Example 5*

A dispersion similar to that of Example 3 was made by using mixed barium sulfate/lead sulphate crystals of the type described in U. S. Patent 2,289,997, in place of calcium tungstate. This dispersion was cast on 0.003 inch paper, coated on each side with cellulose nitrate, by using a doctor blade opening of 0.014 inch to obtain a coating of 0.005 inch thick (dry).

*Example 6*

To 174 cc. of toluene and 1.44 g. of tetraisopropyl titanate there was added rapidly and with agitation 900 g. of mixed barium sulfate/lead sulfate crystals of the type described in U. S. Patent 2,289,997 and 1.2 g. of stearic acid. The mixture was ball milled for 24 hours at which time 240 g. of a 25% by weight solution of chlorosulfonated polyethylene in toluene was added. Using a doctor blade opening of 0.017 inch a coating of the dispersion was applied to 0.003 inch-thick paper, coated on each side with cellulose nitrate, to obtain a (dry) phosphor coating .005 inch thick.

*Example 7*

To 435 cc. of toluene containing 4.5 g. of dioctyl ester of sodium sulfosuccinic acid there was added, with agitation, 2250 g. of calcium tungstate, 3.0 g. stearic acid, 22.5 g. magnesium oxide, 1.5 g. 2-mercaptoimidazoline. The mixture was ball milled for 24 hours and 608 g. of a 25% by weight solution of chlorosulfonated polyethylene in toluene was added thereto. The resultant dispersion was cast on 0.001 inch and 0.0015 inch polyethylene terephthalate films, and 0.010 inch white pigmented calendered "Vinylite" (87% vinylchloride/13% vinylacetate) film, using a 0.020-inch doctor blade opening to obtain a 0.007 inch (dry) phosphor coating.

In the next two examples, the intensifying screens were provided with an antiabrasion or protective coating.

*Example 8*

To the intensifying screens of Example 7 there was applied the following solution to give a dry protective layer having a thickness of 0.0005 to 0.0007 inch:

| | Percent |
|---|---|
| Cellulose nitrate | 11.81 |
| Epoxidized soya oil (mol. wt. about 1000) | 12.0 |
| Toluene | 38.0 |
| Methanol | 38.0 |
| Dibutyl phthalate | 0.06 |
| Camphor | 0.13 |

Stains and dirt were easily removed from the protective layer with a wet cloth.

*Example 9*

To the screens of Example 7 there was applied a coating of a solution of 12% by weight n-butyl methacrylate in methyl ethyl ketone to give a dry protective layer having a thickness of 0.0005 to 0.0007 inch. Ink and pencil marks were easily removed from the protective layer with a wet cloth.

*Example 10*

A solution in 120 g. methanol and 30 g. water of 20 g. of a polyamide made from a mixture of 26% hexamethylene diamine, 37% caprolactum, 20% adipic acid, and 17% sebacic acid, all by weight, as described in U. S. Patent 2,285,009, and 5 g. epoxidized soya oil was coated on the intensifying screens of Example 7 to give a protective layer having a thickness of 0.007 inch. The protective coating was tough and flexible.

*Example 11*

A screen from Example 7 was coated with a solution of 12 parts chlorosulfonated polyethylene and 0.3 to 0.8 part of epoxidized soya oil (mol. weight about 1000) in 100 parts of toluene to give a dry coating thickness of 0.001 inch. This screen when rolled in contact with the gelatino silver halide emulsion layer of a photographic film lightly adheres thereto but can be stripped without any transfer of the phosphor layer to the emulsion layer.

*Example 12*

A polyethylene terephthalate film 0.0015 inch thick was coated, to a dry film thickness of 0.003 to 0.004 inch, with a dispersion containing 1350 g. TiO₂, 3.5 g. stearic acid, 35 g. magnesium oxide, 3.5 g. 2-mercaptoimidazoline, 1000 cc. toluene, 13 g. dioctyl ester of sodium sulfosuccinic acid, 167.5 g. Cumar MH½ [1] (coumarone-indene resin) which had been ball milled for 48 hours after which 670 g. of a 25% solids, by weight of chlorosulfonated polyethylene of the type described in Example 1 was added before coating. The phosphor dispersion of Example 7 was coated over the $TiO_2$ to obtain a dry film thickness of 0.006 inch and this in turn was coated with the anti-abrasion solution of Example 8 to obtain a dry film thickness of 0.0007 inch.

In making the coatings in the foregoing examples, there was used a doctor blade coating apparatus similar to that shown on page 256, Figure 116 of Gardner, Physical & Chemical Examination of Paints, Varnishes, Lacquers and Colors, Ed. VII, October 1935.

By using a light-opaque paper, foil or film support for the screens of the foregoing examples a daylight handling photographic film could be made by applying a sheet to both surfaces of the photographic film with sufficient overlay at the edges to make it light-tight.

All of the phosphor screens described in the foregoing examples had good flexibility and the adherence of the phosphor coating to the surface of the support was adequate. The screens when bent 180° around a ⅟₁₆ inch diameter rod were entirely free from cracks and there was no evidence of fracture of the phosphor layer or separation of such layer from the surface of the support.

The flexible fluorescent screens of this invention may be used in medical and industrial radiography, fluoroscopy, and in industrial monitoring systems. They are particularly suited to industrial radiology where it is desirable to bend the cassette or photographic film holder around the vessel or other object to be radiographed.

The flexible screen having the phosphor layer on a clear or opaque support may be coated, on the phosphor surface, with a pressure-sensitive adhesive and the resultant coated screen laminated to a photographic film for improved contact. Where an opaque support is used the combination can be handled in daylight. After exposure, the screen is stripped from the film and reused or discarded.

An important aspect of the invention resides in the fact that extremely thin fluorescent screens can be made by depositing the dispersion of the finely divided phosphor in the chlorosulfonated olefin polymer and low viscosity solvent onto a very thin film of a polyethylene terephthalate obtainable in accordance with the procedure

---

[1] A cumarone-indene resin having a specific gravity $\frac{15.5°C}{15.5°C} 1.130$ and an iodine number of 43, derived from p-cumarone and indene from the oils recovered from coke ovens (sold by the Barrett Division, Allied Chemical & Dye Corporation).

of Patent 2,465,319. This polyester film, although from 0.00025 to 0.0025 inch in thickness, is tough and durable.

The invention claimed is:

1. A fluorescent screen comprising a sheet support having on at least one surface a flexible layer of finely divided particles of a phosphor dispersed in a chlorosulfonated addition polymer of an olefin containing 1 to 2 olefinic bonds and not more than 5 carbon atoms.

2. A fluorescent screen comprising a flexible sheet support having on at least one surface a flexible layer of finely divided particles of a phosphor dispersed in a chlorosulfonated addition polymer of an olefin containing 1 to 2 olefinic bonds and not more than 5 carbon atoms.

3. A fluorescent screen comprising a flexible sheet support having on at least one surface a flexible layer of finely divided particles of a phosphor dispersed in a chlorosulfonated addition polymer of ethylene.

4. An element as defined in claim 3 wherein said support is a hydrophobic film base.

5. An element as defined in claim 3 wherein said polymer contains 25 to 45% by weight of chlorine in which at least 0.4% is in —$SO_2Cl$ groups.

6. An element as defined in claim 5 wherein said phosphor consists of $BaSO_4/PbSO_4$ mixed crystals.

7. An element as set forth in claim 5 wherein said layer has a thickness of .004 to .009 inch.

8. An element as defined in claim 7 wherein said phosphor consists of $BaSO_4/PbSO_4$ mixed crystals.

9. An X-ray intensifying screen comprising a thin sheet support composed of a polyethylene terephthalate bearing on one surface a thin flexible layer of finely divided particles of a phosphor dispersed in a chlorosulfonated addition polymer of an olefin containing 1 to 2 olefinic bonds and not more than 5 carbon atoms.

10. A screen as defined in claim 9 wherein said olefin is ethylene and said polymer contains 25 to 45% by weight of chlorine in which at least 0.4% is in —$SO_2Cl$ groups.

11. A screen as defined in claim 9 wherein said support has a thickness of 0.00025 to 0.002 inch and said layer has a thickness of 0.004 to 0.009 inch.

12. A screen as defined in claim 11 wherein said phosphor consists of barium sulfate/lead sulfate mixed crystals.

13. An element as defined in claim 5 wherein said phosphor consists of calcium tungstate.

14. An element as defined in claim 7 wherein said phosphor consists of calcium tungstate.

15. A screen as defined in claim 11 wherein said phosphor consists of calcium tungstate.

No references cited.